United States Patent
Lanagan et al.

(10) Patent No.: US 9,740,695 B2
(45) Date of Patent: Aug. 22, 2017

(54) METHOD FOR ENRICHING A MULTIMEDIA CONTENT, AND CORRESPONDING DEVICE

(71) Applicant: THOMSON LICENSING, Issy de Moulineaux (FR)

(72) Inventors: James Lanagan, Rennes (FR); Marie Guegan, Thorigne-Fouillard (FR); Philippe Schmouker, Betton (FR)

(73) Assignee: Thomson Licensing (FR)

( * ) Notice: Subject to any disclaimer, the term of this patent is extended or adjusted under 35 U.S.C. 154(b) by 277 days.

(21) Appl. No.: 14/329,018

(22) Filed: Jul. 11, 2014

(65) Prior Publication Data
US 2015/0019555 A1    Jan. 15, 2015

(30) Foreign Application Priority Data

Jul. 12, 2013  (EP) .................................. 13306002

(51) Int. Cl.
G06F 17/30   (2006.01)

(52) U.S. Cl.
CPC .. G06F 17/30017 (2013.01); G06F 17/30056 (2013.01)

(58) Field of Classification Search
USPC ....... 707/607, 609, 687, 705, 790, 813, 821, 707/953, 964
See application file for complete search history.

(56) References Cited

U.S. PATENT DOCUMENTS

| | | | |
|---|---|---|---|
| 4,996,642 A | 2/1991 | Hey | |
| 8,140,391 B2 | 3/2012 | Jacobi et al. | |
| 2007/0118802 A1 | 5/2007 | Gerace et al. | |
| 2008/0263476 A1 | 10/2008 | Vignoli et al. | |
| 2009/0070346 A1 | 3/2009 | Savona et al. | |

(Continued)

FOREIGN PATENT DOCUMENTS

WO    WO2007047957    4/2007

OTHER PUBLICATIONS

Danescu-Niculescu-Mizil: "Echoes of Power: Language effects and power differences in social interaction"; Proceedings of the 21st intl conference on World Wide Web; Apr. 16-20, 2012, pp. 699-708.

(Continued)

*Primary Examiner* — Sana Al Hashemi
(74) *Attorney, Agent, or Firm* — Jack Schwartz & Associates, PLLC

(57) ABSTRACT

According to the invention, the method comprises the following steps of:
 clustering said plurality of creators to deliver clusters comprising at least two creators, called relevant creators;
 assigning, to at least some relevant creators of the cluster comprising the first creator, called first cluster, a score of relevance determined from at least one criterion of similarity between said relevant creators and said first creator;
 ranking relevant creators of said first cluster according to their scores of relevance;
 selecting, among a plurality of multimedia contents, at least one second multimedia content related to said first multimedia content and delivered by a ranked relevant creator of said first cluster;
 enriching said first multimedia content based on said second multimedia content.

17 Claims, 3 Drawing Sheets

(56) References Cited

U.S. PATENT DOCUMENTS

| | | | |
|---|---|---|---|
| 2011/0098005 A1* | 4/2011 | Selen | H04W 24/08 455/67.11 |
| 2011/0218948 A1* | 9/2011 | De Souza | G06F 15/16 706/12 |
| 2011/0289078 A1 | 11/2011 | Woodard et al. | |
| 2012/0197881 A1 | 8/2012 | Blue et al. | |
| 2012/0284275 A1 | 11/2012 | Vadrevu et al. | |
| 2012/0316962 A1 | 12/2012 | Rathod | |
| 2013/0136416 A1 | 5/2013 | Sathish et al. | |
| 2014/0108562 A1* | 4/2014 | Panzer | G06Q 50/01 709/206 |

OTHER PUBLICATIONS

Lanagan et al; "Video digital libraries: contributive and decentralised"; International Journal on Digital Libraries; published Jan. 24, 2012, pp. 1-22.

Pang et al: "Opinion Mining arid Sentiment Analysis"; Foundations and Trends In Information Retrieval; vol. 2, Nos. 1-2 (2008) pp. 1-135.

Plucker et al: 'Do experts and novices evaluate movies the same way?; Psychology & Marketing: vol. 26, Issue 5, pp. 470-478, May 2009.

Raveendran et al; "Lightweight Contrastive Summarization for News Comment Mining"; Proceedings of the 35th Intl Conf., SIGIR'12, Aug. 12-16, 2012, pp. 1103-1104.

Tanga etal: "Survey on sentiment detection of reviews"; Expert Systems with Applications: An International Journal; vol. 36 ,Issue 7, Sep. 2009 pp. 10760-10773.

Thet et al: "Aspect-based sentiment analysis of movie reviews on discussion boards"; Journal of Information Science, 36(6), 2010; pp. 823-848.

Search Report Dated November 15, 2013.

* cited by examiner

METHOD FOR ENRICHING A MULTIMEDIA CONTENT, AND CORRESPONDING DEVICE

1. TECHNICAL FIELD

The field of the invention generally relates to multimedia contents, for instance published over a network (such as Internet), and more specifically to techniques for enriching such multimedia contents with metadata (such as written commentaries, audio contents, video clips, etc.).

2. BACKGROUND ART

Annotation of multimedia contents (such as Audio/Video contents or written articles) with additional information (so called metadata) is increasingly becoming a main issue to cope with, due to the massive amount of available data. Such metadata may come from professional sources, but may also come from user sources, such as social networks and web forums.

To face with such a huge amount of data, there is a need to identify and to filter the most relevant additional information to a given multimedia content, such pieces of information being retrieved, for instance, from social networks over the Internet, Web forum, dedicated websites, etc.

Prior art solutions often implement search engines using keywords or fixed taxonomy, to browse and to access metadata associated to a given multimedia content over the Internet. Nevertheless, current search engines do not take into account the relevance of the metadata before delivering them to requesting users, but only use requested keywords in or related to the given multimedia content.

In addition, it is also known to select, for a given multimedia content published on-line, the related metadata approved by a large majority of web users thanks to, for instance, "plus on" or "like" actions. However, such an identification of relevant metadata requires interactions of other web users.

Thus, there remains a significant need for identifying the most interesting metadata in order to enrich a given multimedia content.

3. SUMMARY OF THE INVENTION

The aim of the invention is thus that of remedying at least some of the previously mentioned drawbacks and, notably, improving the retrieval of relevant additional information closely linked to a given multimedia content.

Thus, according to at least one embodiment, the solution of the invention provides a new way of enriching a multimedia content.

The aforementioned problem can be solved, according to one aspect of the disclosure, by a method for enriching a first multimedia content created by a first creator, among a plurality of multimedia content creators.

According to the invention, said method comprises the following steps of:
 clustering said plurality of creators to deliver clusters comprising at least two creators, called relevant creators;
 assigning, to at least some relevant creators of the cluster comprising the first creator, called first cluster, a score of relevance determined from at least one criterion of similarity between said relevant creators and said first creator;
 ranking relevant creators of said first cluster according to their scores of relevance;
 selecting, among a plurality of multimedia contents, at least one second multimedia content related to said first multimedia content and delivered by a ranked relevant creator of said first cluster;
 enriching said first multimedia content based on said second multimedia content.

Thus, the present invention can act as a filter applied on available multimedia data related to a given multimedia content in order to automatically deliver additional data with the greatest potential value. It may then permit to enrich said given multimedia content thanks to one or more multimedia content, that have been automatically retrieved (e.g. from Internet) and considered as being relevant, by taking into account the similarities between the creators of both the given and additional contents (in other words, how much closely related to each other they are). It allows for richer description of the given multimedia content.

According to a preferred embodiment, said method comprises a further step of extracting, from the second multimedia content, at least one element related to said first multimedia content.

In addition, said step of extracting can rely on natural language processing.

Moreover, said clustering step can implement a K-means algorithm based on a set of identified features. Obviously, other kinds of clustering algorithms might be used.

The features associated to a creator may notably include a domain of interest, a linguistic style, some social indicator of activities of the creator, etc. Some features may be automatically extracted from the creator's profile in an online community, for example via natural language processing techniques such as information extraction, named entity recognition (for example recognition of a name of a character, of a specific location, and so on), or feature-based sentiment analysis (also called "opinion mining"). Such features can include for example a qualification of the creator, like "professional", "non-professional", "robot", and so on . . . Some other features can be gathered by analyzing the creators social centrality and productivity in an online community (for example a forum of movies addicts), with graph-based or numeric measures techniques. Such features may be related to the contribution of the creator, like a number of multimedia content published, or stylist language descriptors, or an element extracted for a created content (for example, an element frequently present in the creator contents).

Each cluster may comprise creators with close features sets (aka for whom the set of features get close values according to the criterion of similarity).

In addition, said selected second multimedia content can be created by the ranked relevant creator of said first cluster having the highest score of relevance among assigned scores of relevance.

Besides, said method can comprise the selection of several second multimedia contents related to said first multimedia content and delivered by ranked relevant creators of said first cluster having a score of relevance at least equal to a threshold of relevance.

Moreover, said criterion of similarity can advantageously be a distance criterion (such as the Euclidian distance, the Manhattan distance, etc.).

As an example, said first multimedia content can be a textual content. Such textual content may denote any kind of text written by a Web user such as a product, a service or an event comment, a story, a blog or forum post, for example.

The disclosure further relates to a device for enriching a first multimedia content created by a first creator, among a plurality of multimedia content creators.

According to the invention, said device comprises the following modules:

- a clustering module configured to cluster said plurality of creators to deliver clusters comprising at least two creators, called relevant creators;
- an assigning module configured to assign, to each relevant creator of the cluster comprising the first creator, called first cluster, a score of relevance determined from at least one criterion of similarity between said relevant creator and said first creator;
- a ranking module configured to rank relevant creators of the first cluster according to their scores of relevance;
- a selecting module configured to select, among a plurality of multimedia contents, at least one second multimedia content related to the first multimedia content and delivered by a ranked relevant creator of the first cluster;
- an enriching module configured to enrich the first multimedia content based on said second multimedia content.

In particular, said device further comprises an extracting module adapted to extract, from said second multimedia content, at least one element related to said first multimedia content.

The disclosure further relates to a computer program product downloadable from a communication network and/or recorded on a medium readable by computer and/or executable by a processor, comprising program code instructions for implementing said method for enriching a multimedia content.

The disclosure further relates to a non-transitory computer-readable medium comprising a computer program product recorded thereon and capable of being run by a processor, including program code instructions for implementing said method for enriching a multimedia content.

Although examples of the invention have been described hereinabove in relation with a limited number of embodiments, those skilled in the art, when reading this description, will understand that other embodiments can be imagined without leaving the scope of this invention.

In particular, while not explicitly described, the present embodiments may be employed in any combination or sub-combination.

4. BRIEF DESCRIPTION OF THE DRAWINGS

Other characteristics and advantages of embodiments of the invention shall appear when reading the following description, provided by way of a non-restricted and indicative example (all of the embodiments of the invention are not limited to the characteristics and advantages of the embodiments described hereinafter), and the annexed drawings, wherein.

Figure 3:
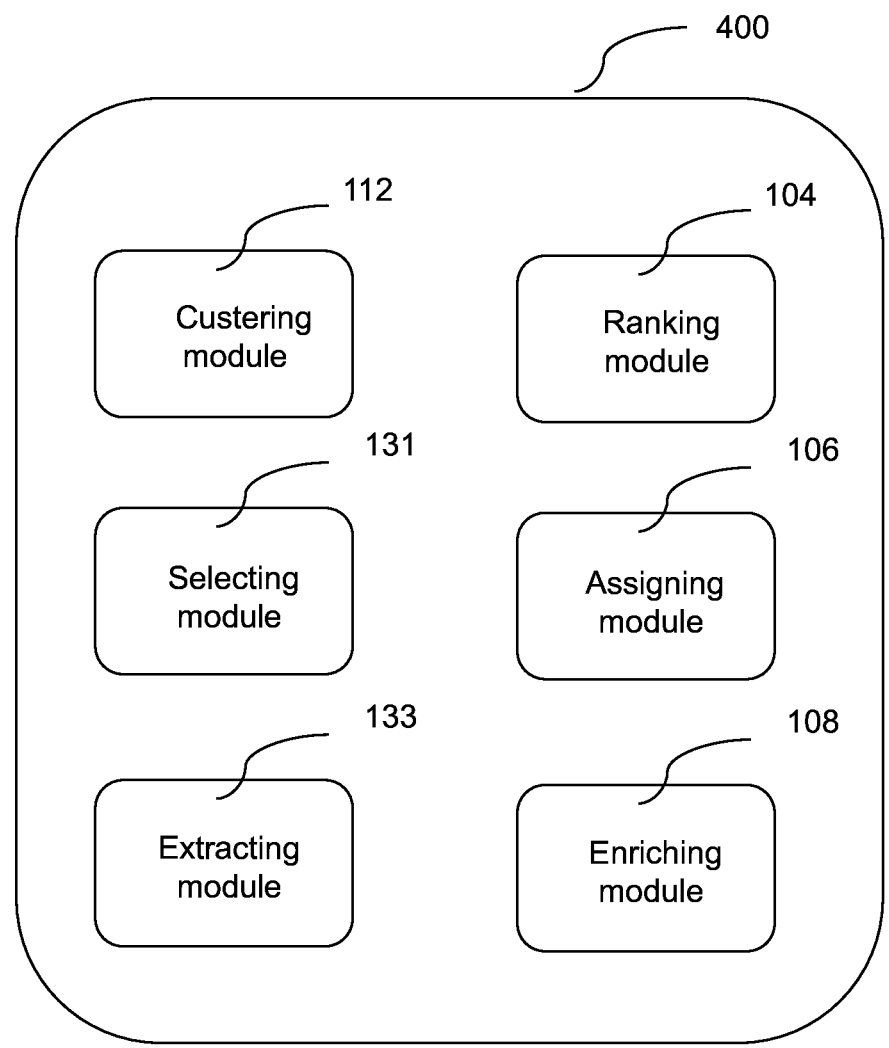
FIG. 3 is a block diagram of an example of a device adapted for implementing the method described in FIG. 1.

In FIG. 3, the represented blocks are purely functional entities, which do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

5. DESCRIPTION OF EMBODIMENTS

Figure 1:
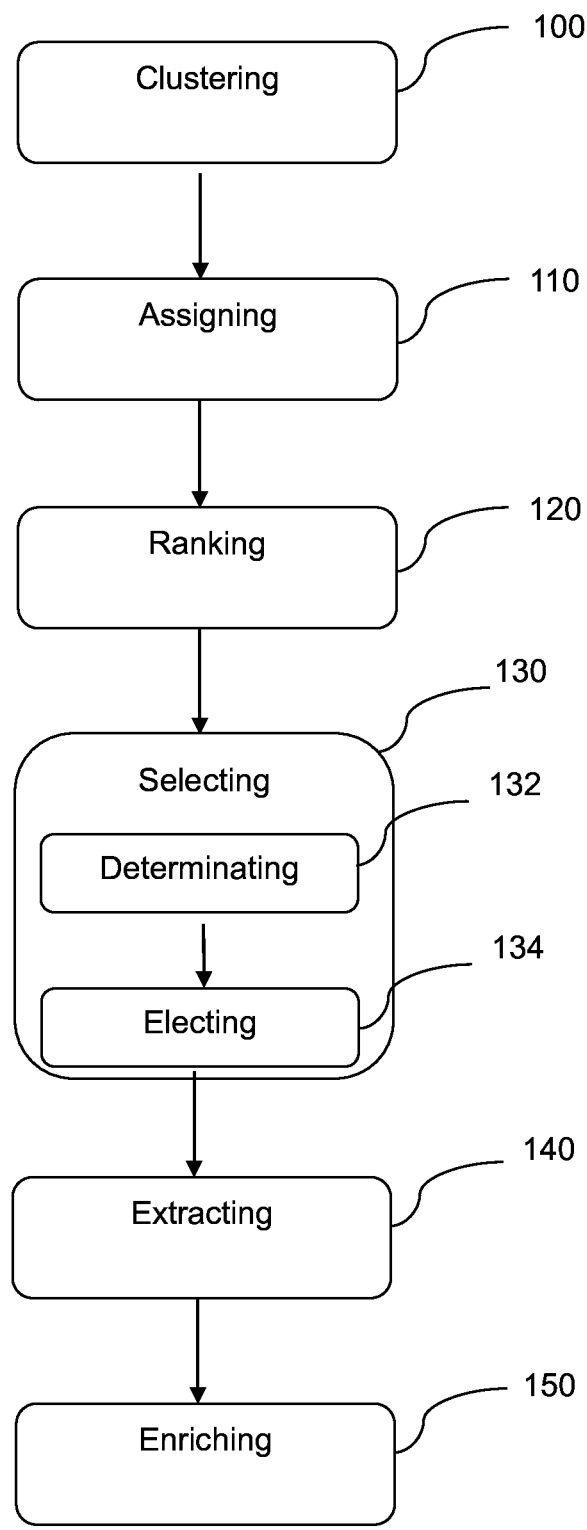
FIG. 1 shows the main steps of the method according to a preferred embodiment of the present invention.

According to a preferred embodiment of the present invention, as shown on FIG. 1, it is proposed a new and inventive method M for enriching a considered multimedia content—built by a given creator—thanks to the retrieval and analysis of additional multimedia contents related to said considered content and published on a network (such as the Internet) by other creators. The additional multimedia contents may have been created by other creators.

It should be understood that a multimedia content may be as diverse as a movie review, an A/V content (as a video clip), a story, a report (for example a sport match report), etc.

Figure 2:
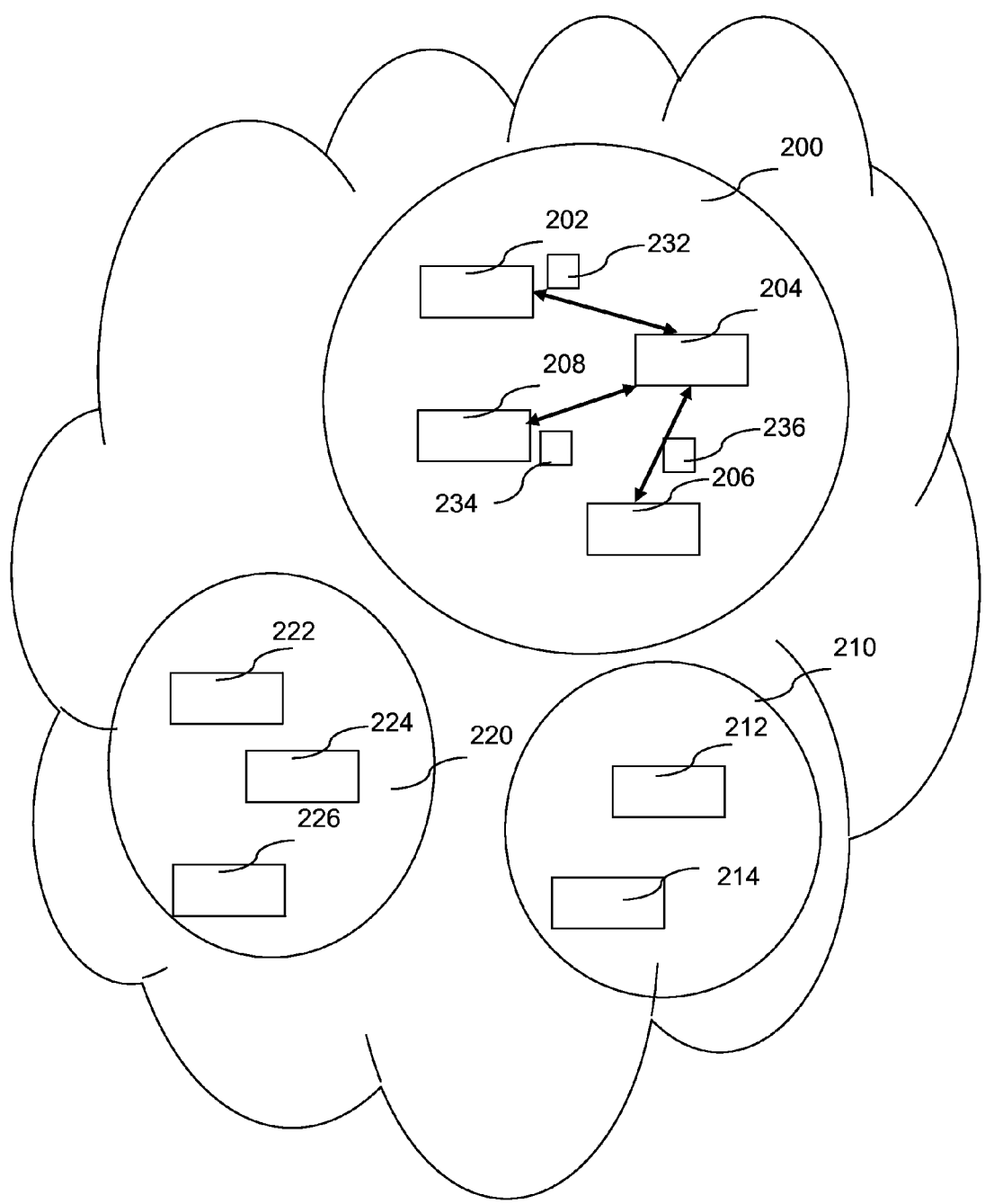
FIG. 2 represents a plurality of creators of multimedia contents.

Besides, as shown on FIG. 2, the multimedia content creators 202, 204, 206, 208, 212, 214, 222, 224, 226 may correspond, for instance, to some or all the members of an online community such as a web forum dedicated to movies, a social network, etc. Said plurality of creators may include professionals creating or delivering multimedia articles (such as written articles, picture or video for Web newspaper), and non-professional users (so called web users) publishing comments on events, products, services, articles created by professionals.

It has also to be noted that, in a variant of the present invention, multimedia contents might be automatically created, for instance by adapted content builders.

Each creator may be described by a set of features obtained, for instance, from the creator's profile or related to contents they have created. As an illustrative example, such features might correspond to the number of created contents, the stylistic language, the median number of named entities mentioned in their contents, the number of movies they have commented, etc.

FIG. 1 illustrates the main steps of the method M for enriching a considered multimedia content (such as a web content) created by a given content creator 204, belonging for instance to a web community related to movies. The plurality of creators 202, 204, 206, 208, 212, 214, 222, 224, 226—forming said web community—is represented in FIG. 2. It may include, for example, both professional critics and non-professional members.

As illustrated by FIGS. 1 and 2, the method M comprises a clustering step 100 of the plurality of creators to establish several clusters of creators. For example, as represented by FIG. 2, creators 202, 204, 206, 208, 212, 214, 222, 224, 226 may be clustered in different clusters 200, 210, 220 depending on their features sets. Each cluster contains creators for whom the set of features get close values according to a computed criterion of similarity.

The clustering step 100 acts as a pre-filtering step so as to reduce the amount of work (notably in terms of speed and memory consumption in a device implementing the method M) that is to be done during the following steps of said method M.

For instance, the clustering step 100 may be performed each time a considered multimedia content of a given creator is to be enriched, or only at the creation of the plurality of creators, or each time a creator is added to said plurality, or from time to time (for example on a periodic basis) or according to an increase ratio of the number of creators.

According to an illustrative but non limitative example of the preferred embodiment, creators 202, 204, 206, 208, 212, 214, 222, 224, 226 are clustered by using a K-Means algorithm. A k-means clustering aims to partition a set of n observations ($x_1, x_2, \ldots, x_n$), where each observation is a d-dimensional real vector, into k clusters (k≤n) S={$S_1, S_2, \ldots, S_k$} so as to minimize the within-cluster sum of squares (WCSS):

$$\underset{S}{\operatorname{argmin}} \sum_{i=1}^{k} \sum_{x_j \in S_i} \|x_j - \mu_i\|^2$$

where $\mu_i$ is the mean of points in $S_i$.

Each creator is represented by an observation $x_i$ and the creators are clustered according to their vector of feature values (corresponding to the features set). The number of clusters to a given set of creators may vary. Notably, algorithms (such as the Hartigan algorithm or the Krzanowski & Lai algorithm) may be used in order to define an optimal value of k.

For each of these creators, a number of features {f1, f2, ... fn} describing the creator is defined to form the vector of features.

As shown in FIG. 2, the k-means algorithm—used on the features vectors of the creators 202, 204, 206, 208, 212, 214, 222, 224, 226—leads to the partition of the creators 202, 204, 206, 208, 212, 214, 222, 224, 226 into several clusters 200, 210 and 220.

Obviously, the clustering step 100 may implement other clustering techniques, such as hierarchical clustering or spectral clustering for instance.

The clustering step 100 acts as a pre-filtering of the most interesting creators to the given creator 204 of the considered multimedia content to enrich with additional data. It then leads to identify relevant creators 202, 206, 208 having similarities with the creator 204 of said given multimedia content.

Moreover, by considering the given creator 204 of the considered multimedia content belonging to cluster 200, the method M further comprises the following steps of:

assigning (step 110) a score of relevance 232, 236, 238 to each relevant creator 202, 206, 208 of the cluster 200 (in a variant, only some of the relevant creators of a cluster may have been assigned a score of relevance). In particular, each score of relevance is assessed in association with the given creator 204, depending on a criterion of similarity between the given creator 204 and the assessed relevant creators 202, 206, 208. As an example, the criterion of similarity can be a distance criterion. The distance can be estimated by comparing the features set (at least one or several features of the set) of a considered relevant creator 202, 206, 208 of the cluster 200 with the features set of the given creator 204. Indeed, creators are grouped together within clusters according to the proximity of their associated valuated features. All creators being characterized by the exact same set of features, any kind of distance measure applied to these sets of values can be used, e.g. Euclidian distance, Manhattan distance, min or max difference between two feature values, etc.:

Euclidian distance: $\text{dist}_{euclidian} = \sqrt{\sum_{i<n}(x_i - x'_i)^2}$
Manhattan distance: $\text{dist}_{manhattan} = \sum_{i<n} |x_i - x'_i|$
Max difference: $\text{dist}_{max} = \arg \max_{i<n}(|x_i - x'_i|)$ where $x_i$ (respectively $x'_i$) is a numerical feature value for creator x (respectively creator x') among n features.

ranking (step 120) the relevant creators 202, 206, 208 of the cluster 204, according to their score of relevance 232, 236, 238;

selecting (step 130) one or more additional multimedia contents related to the considered multimedia content of the given creator 204, amongst some multimedia contents delivered by ranked relevant creators 202, 206, 208 of the cluster 200. It should be noted that the additional multimedia contents might be previously crawled or retrieved from dedicated websites, the association between the given multimedia content and additional multimedia content being preferably already known at the time of crawling;

extracting (step 140) an element from selected additional multimedia content(s). Notably, this extraction step may be based on natural language processing and/or text-mining techniques. Such an extracting step 140 may be combined and merged with the selection step 130 (for example during an election sub-step 132, as described hereinafter);

enriching (step 150) the considered multimedia content based on the additional contents selected in step 130. Notably, said considered multimedia content may be enriched by incorporation of metadata (such as a part of the additional multimedia content (as an extracted element), a link to this additional content, etc.) and/or by the addition of metadata in a content descriptor associated to the considered multimedia content, for example textual data extracted from the selected additional multimedia content(s).

In particular, the selecting step 130 comprises sub-steps of:

determining (step 132) the most relevant creator(s), amongst the ranked creators of the cluster 200. The determination step 132 may result in the selection of:
 only one ranked creator, for example the creator with the highest score of relevance among all the scores of relevance assigned in cluster 200; or
 several ranked creators having the "p" highest score of relevance (with "p" being a predetermined number); or
 several ranked creators having a score of relevance greater than a predefined threshold of relevance;

electing (step 134) at least one additional multimedia content, amongst the contents delivered by the determined relevant creators. The electing sub-step 134 may be based for example on the meta data associated to an additional multimedia content, or on comments associated to said additional content, or to an element extracted from said additional content (for example during the extraction step 140). In other variants, the election step may lead to the selection of the more recent contents, or the more commented contents, etc.

In other words, the electing sub-step 134 may result in the selection of:
 one or more additional multimedia contents delivered by the ranked creator with the highest score of relevance;
 several additional multimedia contents such as the "m" most similar contents amongst the contents delivered by the ranked creators having the "p" highest score of relevance (with "m" being also a predetermined number), or amongst the contents delivered by the ranked creators having a score of relevance greater than a certain predetermined threshold.

As an example, those selected additional multimedia contents can then be added—during the enriching step 150—to the considered multimedia content itself, or to a descriptor associated with said considered content.

It should be understood that, in variant, the steps of the method M might obviously be implemented in a different order as the one previously described.

According to the invention, the method M may be preferably performed more or less automatically, with few (or even no) action from the creator of the considered multimedia content or from a content viewer.

In addition, thanks to the invention, the relevance of the creators can be considered (step 100) in addition with the relevance of the contents published by at least one of the relevant creators (steps 110, 120, 130). This may lead to the selection of the most accurate contents of the most relevant creators. The quality of metadata associated to a given multimedia content might be improved, with few (or even no) user interactions.

Besides, the steps of method M for enriching multimedia content previously described might be implemented by a device 400 as shown on FIG. 3, which might be, for instance, connected to a communication network, such as an Internet type network.

In particular, by considering a given creator 204 of a considered multimedia content, the device 400 might comprise:
- a clustering module 112 configured to cluster a plurality of creators 202, 204, 206, 208, 212, 214, 222, 224, 226 for delivering clusters comprising two or more relevant creators;
- an assigning module 106 configured to assign, to each relevant creator 202, 206, 208 of the cluster 200 comprising the given creator 204 a score of relevance determined from the criterion of similarity between said relevant creators and the given creator 204;
- a ranking module 104 configured to rank relevant creators 202, 206, 208 of the cluster 200 according to their scores of relevance;
- a selecting module 131 configured to select, among a plurality of multimedia contents, one or more additional multimedia contents related to the considered multimedia content, which have been delivered by a ranked relevant creator 202, 206, 208 of said cluster 200;
- an extracting module 133 adapted to extract, from said addition multimedia content(s), at least one element related to the considered multimedia content, thanks to, for instance, Natural Language Processing;
- an enriching module 108 configured to enrich the considered multimedia content based on said additional multimedia content(s) thanks to, for instance, the extracted element(s).

These modules might be driven by a microprocessor of a processing unit (not shown on FIG. 3).

As will be appreciated by one skilled in the art, aspects of the present principles can be embodied as a method, a device, a computer readable medium or a computer program product.

Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system", the whole being embedded in a single device or in many devices that are connected together by any kind of means. Furthermore, aspects of the present principles can take the form of a computer readable storage medium. Any combination of one or more computer readable storage medium(s) may be utilized.

References disclosed in the description, the claims and the drawings may be provided independently or in any appropriate combination. Features may, where appropriate, be implemented in hardware, software, or a combination of the two.

Reference numerals appearing in the claims are by way of illustration only and shall have no limiting effect on the scope of the claims.

This invention having been described in its preferred embodiment, it is clear that it is susceptible to numerous modifications and embodiments within the ability of those skilled in the art and without the exercise of the inventive faculty. Accordingly, the scope of the invention is defined by the scope of the following claims.

In the claims hereof, any element expressed as a means for performing a specified function (e.g. the clustering module 112, the assigning module 106, the ranking module 104, the selecting module 131, the extracting module 133, the enriching module 108, etc.) is intended to encompass any way of performing that function including, for example, a) a combination of circuit elements (for instance one or more processors) that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

The invention claimed is:

1. Method for enriching a first multimedia content created by a first creator, among a plurality of multimedia content creators within an online community, comprising, at a microprocessor:
    forming clusters, at a clustering circuit of said microprocessor, from said plurality of multimedia content creators, each cluster comprising at least two relevant creators from said plurality of multimedia content creators;
    assigning, at an assigning circuit of said microprocessor, to a first cluster including the first creator, a score of relevance to each relevant creator within the first cluster, said score of relevance being determined from at least one criterion of similarity between each respective relevant creator and said first creator;
    ranking, at a ranking circuit of said microprocessor, said relevant creators of said first cluster according to scores of relevance assigned to each relevant creator of said first cluster;
    selecting, at a selecting circuit of said microprocessor, among a plurality of multimedia contents from the ranked relevant creators, at least one second multimedia content related to said first multimedia content for enriching the first multimedia content;
    retrieving said at least one second multimedia content selected from the ranked relevant creators; and
    enriching, at an enriching circuit of said microprocessor, said first multimedia content based on said at least one second multimedia content.

2. Device for enriching a first multimedia content created by a first creator, among a plurality of multimedia content creators within an online community, wherein the device comprises a microprocessor comprising:
- a clustering circuit configured to form clusters from said plurality of multimedia content creators, each cluster comprising at least two relevant creators from said plurality of multimedia content creators;
- an assigning circuit configured to assign, to a first cluster including the first creator, a score of relevance to each relevant creator within the first cluster, said score of relevance being determined from at least one criterion of similarity between each respective relevant creator and said first creator;
- a ranking circuit configured to rank said relevant creators of the first cluster according to scores of relevance assigned to each relevant creator of said first cluster;
- a selecting circuit configured to select, among a plurality of multimedia contents from the ranked relevant creators, at least one second multimedia content related to the first multimedia content for enriching the first multimedia content and retrieving said at least one second multimedia content selected from the ranked relevant creators of the first cluster;
- an enriching circuit configured to enrich the first multimedia content based on said at least one second multimedia content.

3. Non-transitory computer-readable medium comprising a computer program product recorded thereon and capable of being run by a processor, including program code instructions for
- forming clusters, at a clustering circuit of said microprocessor, from said plurality of multimedia content creators, each cluster comprising at least two relevant creators from said plurality of multimedia content creators;
- assigning, at an assigning circuit of said microprocessor, to a first cluster including the first creator, a score of relevance to each relevant creator within the first cluster, said score of relevance being determined from at least one criterion of similarity between each respective relevant creator and said first creator;
- ranking, at a ranking circuit of said microprocessor, said relevant creators of said first cluster according to scores of relevance assigned to each relevant creator of said first cluster;
- selecting, at a selecting circuit of said microprocessor, among a plurality of multimedia contents from the ranked relevant creators, at least one second multimedia content related to said first multimedia content for enriching the first multimedia content;
- retrieving said at least one second multimedia content selected from the ranked relevant creators; and
- enriching, at an enriching circuit of said microprocessor, said first multimedia content based on said at least one second multimedia content.

4. Method according to claim 1, further comprising extracting, from said second multimedia content, at least one element related to said first multimedia content.

5. Method according to claim 1, wherein said clustering implements a K-means algorithm based on a set of identified features.

6. Method according to claim 1, wherein said selected second multimedia content is created by the ranked relevant creator of said first cluster having a highest score of relevance among assigned scores of relevance.

7. Method according to claim 1, further comprising selecting several second multimedia contents related to said first multimedia content and receiving said selected several second multimedia contents from ranked relevant creators of said first cluster having a score of relevance at least equal to a threshold of relevance.

8. Method according to claim 1, wherein said criterion of similarity is a distance criterion.

9. Method according to claim 1, wherein said first multimedia content is a textual content.

10. Device according to claim 2, further comprising an extracting circuit adapted to extract, from said second multimedia content, at least one element related to said first multimedia content.

11. The device according to claim 2, wherein said clustering circuit forms clusters by implementing a K-means algorithm based on a set of identified features.

12. The device according to claim 2, wherein said second multimedia content is created by the ranked relevant creators of said first cluster having a highest score of relevance among assigned scores of relevance.

13. The device according to claim 2, wherein said selecting circuit selects several second multimedia contents related to said first multimedia content and receives said selected several second multimedia contents from ranked relevant creators of said first cluster having a score of relevance at least equal to a threshold of relevance.

14. The device according to claim 2, wherein said at least one criterion of similarity is a distance criterion.

15. The device according to claim 2, wherein said first multimedia content is a textual content.

16. Method according to claim 4, wherein the extracting relies on natural language processing.

17. The device according to claim 10, wherein said extracting circuit extracts using natural language processing.

* * * * *